United States Patent
Gibbons et al.

[11] Patent Number: 6,143,380
[45] Date of Patent: Nov. 7, 2000

[54] PROCESS AND MATERIALS FOR ALIGNING LIQUID CRYSTALS AND LIQUID CRYSTAL DISPLAYS

[75] Inventors: Wayne M. Gibbons, Bear; Patricia A. Rose, Wilmington, both of Del.; Paul J. Shannon, Exton, Pa.; Hanxing Zheng, Wilmington, Del.

[73] Assignee: Elsicon Inc., Newark, Del.

[21] Appl. No.: 09/467,582

[22] Filed: Dec. 20, 1999

[51] Int. Cl.⁷ .................................................. G02F 1/1337
[52] U.S. Cl. ..................... 428/1.27; 428/1.26; 349/124; 427/532
[58] Field of Search .................. 428/1.26, 1.27; 349/124; 427/532; 528/353

[56] References Cited

U.S. PATENT DOCUMENTS

| | | |
|---|---|---|
| 4,002,645 | 1/1977 | Sonnenberg . |
| 5,807,498 | 9/1998 | Gibbons et al. . |
| 5,958,293 | 9/1999 | Gibbons et al. . |

OTHER PUBLICATIONS

J.R. Pratt, et al. Polym. Engineering & Sci., 29 No. 1, Jan., 1989, 63–68.

*Primary Examiner*—Alexander S. Thomas
*Attorney, Agent, or Firm*—Paul J. Shannon

[57] ABSTRACT

The present invention provides a process for preparing an optical alignment layer for aligning liquid crystals and liquid crystal displays comprising exposing polyimide layers with polarized light. The invention further describes optical alignment layers, liquid crystal displays incorporating optical alignment layers and novel polymer compositions within the class of polyimide, polyamic acids and esters thereof.

4 Claims, 2 Drawing Sheets

PROCESS AND MATERIALS FOR ALIGNING LIQUID CRYSTALS AND LIQUID CRYSTAL DISPLAYS

BACKGROUND OF INVENTION

The present invention relates to processes and materials for aligning liquid crystals, and liquid crystal optical elements.

Current liquid crystal display (LCD) elements include a product that utilize a twisted nematic mode, i.e., having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, an in-plane-switching mode wherein both electrodes controlling the liquid crystal alignment are present on one substrate and the direction of the liquid crystal orientation in the plane of the substrate changes upon application of an electric field, and a product utilizing a ferroelectric liquid crystal substance or an antiferroelectric liquid crystal substance. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fiberous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. No. 5,807,498 "Process and Materials for Aligning Liquid Crystals and Liquid Crystal Optical Elements".

The process for aligning liquid crystal media with polarized light is a non-contact method of alignment that has the potential to reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios (VHR), long-term thermal and optical stability, and in many applications a controlled uniform pre-tilt angle.

Most liquid crystal devices, including displays, have a finite pre-tilt angle, controlled, for instance, by the mechanical buffing of selected polymeric alignment layers. The liquid crystal molecules in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable.

Polymers used in forming optical alignment layers also must have a reasonably broad processing window. Polymers used as alignment layers in commercial liquid crystal displays are generally polyimide-based systems because of their good thermal and electrical properties. Thus, within the polyimide family, polymers also must have functionality that is stable to thermal and/or chemical imidization. In addition, polymers must have good wetting characteristics and printability onto substrates to give uniform layers.

Several approaches have been explored to meet the performance requirements of optical alignment layers for liquid crystal displays. In particular, U.S. Pat. No. 5,807,498 describes polyimide optical alignment layers having diaryl ketones as the anisotropically absorbing molecules. These materials can give good to excellent uniformity of alignment of liquid crystals. However, mass production of liquid crystal displays generally requires materials that are more photosensitive to light than the diaryl ketone based polyimides, and have improved electrical properties, especially with regard to VHR.

In further developing materials and processes for optical alignment layers, new classes of reactive materials have been developed that suggest an increased photosensitivity of polyimides by incorporating higher densities of anisotropically absorbing moieties. Surprisingly, the new materials exhibit improved VHR, especially at elevated temperatures.

SUMMARY OF INVENTION

The present invention provides a process for preparing an optical alignment layer for aligning liquid crystals comprising: preparing a polyimide layer, comprising anisotropically absorbing molecules, on a substrate; exposing said polyimide layer to polarized light; the polarized light having a wavelength within the absorption band of said anisotropically absorbing molecules; wherein the resulting exposed anisotropically absorbing molecules induce alignment of a liquid crystal medium at an angle with respect to the major axis of the polarization of the incident light and along the surface of the optical alignment layer; wherein the polyimide layer comprises the structural element I wherein Ar is a divalent aryl radical and A is a divalent organic radical with two or more

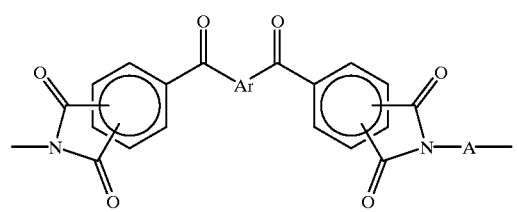

carbons. The invention further embodies optical alignment layers prepared by the process, liquid crystal display elements incorporating the optical alignment layers and novel polymer compositions within the class of polyimides, polyamic acids and esters.

DETAILED DESCRIPTION

Figure 1:
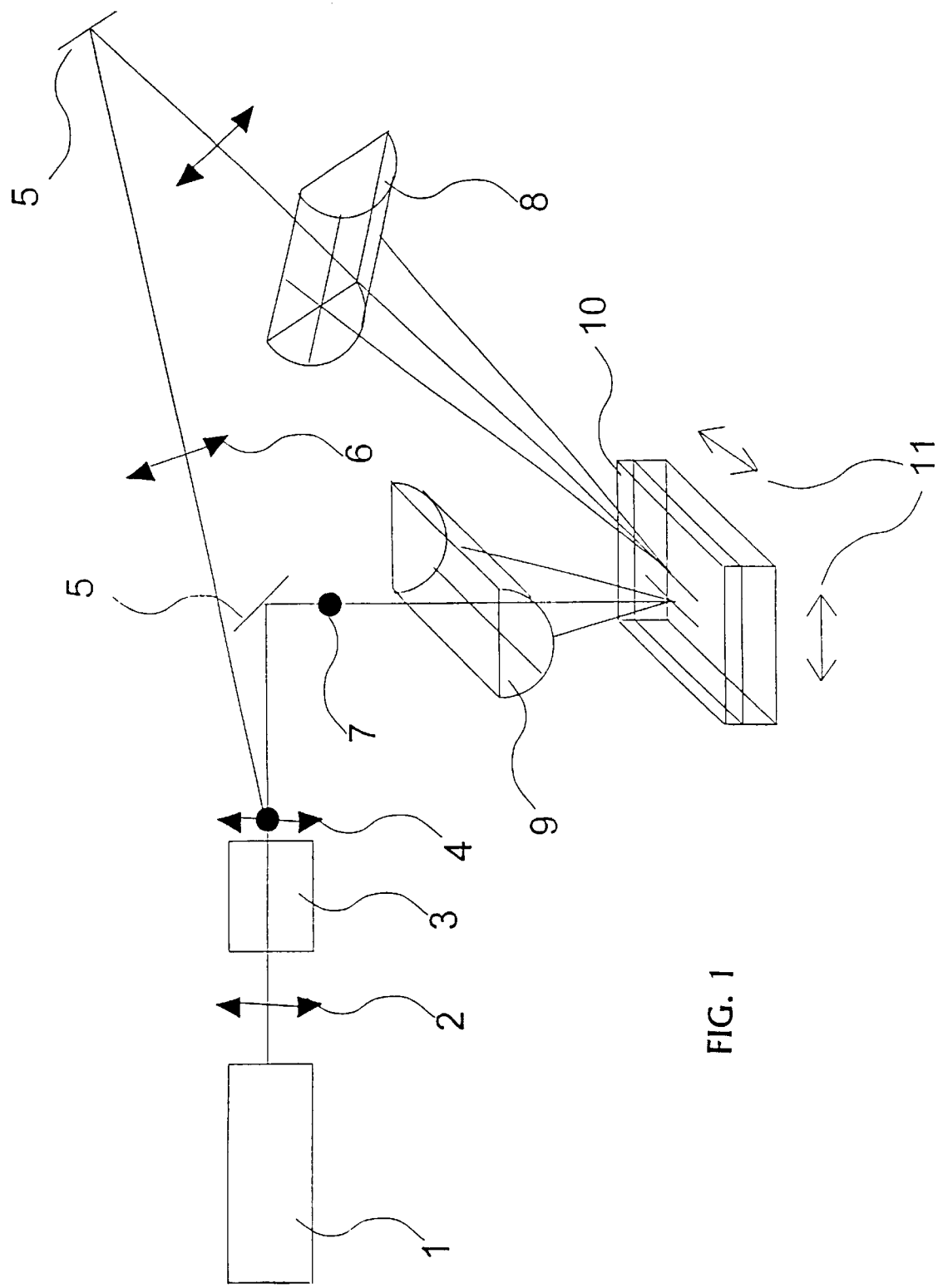
FIG. 1 illustrates the optical system used to expose the substrates to UV light.

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

"Optical alignment layer" herein refers to an alignment layer that contains anisotropically absorbing molecules that is exposed with polarized light sufficient to induce alignment of liquid crystals. The optical alignment layer can be an isotropic medium or have some degree of anisotropy before optical alignment. Optical alignment layers may be processed by conventional means, such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between 150 nm and about 2000 nm. Most preferable optical alignment layers for the present invention have absorbance maxima of about from 150 to 400 nm and especially about from 300 to 400 nm.

Polymers especially useful and preferred as optical alignment layers are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate. Copolymer polyimides are prepared by the condensation of one or more diamines with one or more dianhydrides to give a copolyamic acid.

An alternative intermediate to polyimides are poly(amic esters) that can be made by esterification of poly(amic acids) with alcohols. The poly(amic esters) undergo thermal imidization to form polyimides.

Thus, poly(amic acids) and poly(amic esters) are considered to be closely related percursors to polyimides of the invention. Therefore, they are considered further embodiments of this invention. Furthermore, preimidized polyimides derived from chemical or thermal imidzation of poly(amide acids) or poly(amide esters) are also considered an embodiment of the invention.

The process of the invention requires a polyimide comprising the structural element I

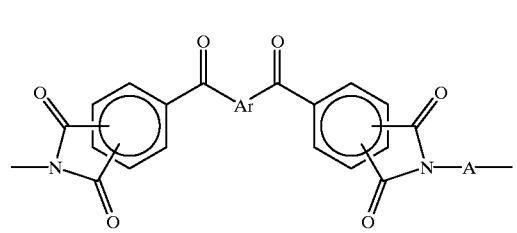

wherein Ar is a divalent aryl radical and A is a divalent organic radical with two or more carbons.

By "divalent aryl radical" is meant that the radical may be comprised of aromatic and heteroaromatic rings containing one to six rings. The radical may have fused rings to form a polycyclic radical. The radical may have rings covalently linked through a covalent bond or a linking group. The radical may have a mix of fused and covalently linked rings. Preferred polyimides for the process are those in which Ar is selected from the group of

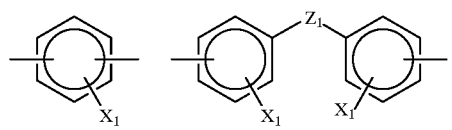

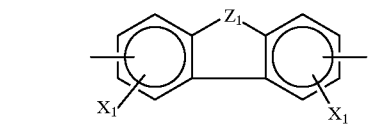

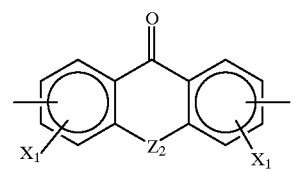

wherein $X_1$, independently, is selected from the group of H, Cl, Br, F, —CN, —CF$_3$, —(R)$_2$N—, —OR and R, $Z_1$ is selected from the group of covalent bond, —O—, —NR$_1$—, —(R$_1$)$_2$C—, —CH$_2$CH$_2$—, and —C(O)—, $Z_2$ is selected from the group —O—, —NR$_1$—, and —(R$_1$)$_2$C—, R$_1$ is H or lower alkyl group and R is a lower alkyl group.

Another embodiment of the invention are novel polymers within the class of polyimides, polyamic acids and esters thereof, characterized in that they comprise identical or different repeat units selected from one or more of the formula

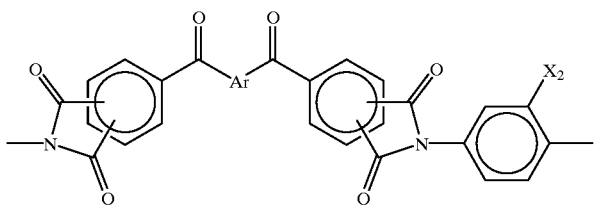

Ia

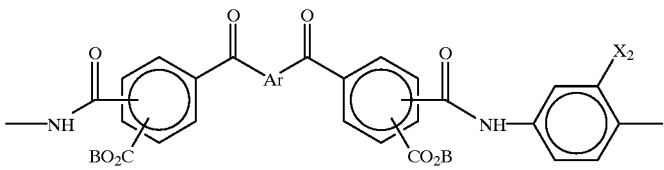

Ib wherein B is hydrogen or a monovalent organic group derived from an alcohol after formal removal of the hydroxyl group, $X_2$ is an electron withdrawing group having a positive σ, Ar is a divalent aryl group and the carboxyl groups are in an ortho position relative to each other. The propensity for an organic substituent to donate or withdraw electron density from a electronic system is described by the Hammett equation. J. March describes the Hammett equation in detail in "Advanced Organic Chemistry, Reactions, Mechanism, and Structure", McGraw-Hill, Publishers, New York 1977, p. 252–255. A positive value of a indicates an electron-withdrawing group and a negative value an electron-donating group. More preferred polymers within this class are those wherein $X_2$ is selected from the group of —CN, —$CF_3$, $CO_2R$, F, Cl, Br, and —$NO_2$ wherein R is a lower alkyl group. Most preferred polymers within this class are those wherein $X_2$ is selected from the group of —CN and —$CF_3$ and Ar is selected from the group described above.

The dianhydrides required for the synthesis of these polyimides are available by synthesis and are referred to as bis-(dicarboxyphenylketone)aryl dianhydrides. Several bis (3,4-dicarboxyphenylketone)aryl dianhydrides are listed in Table 1. J. R. Pratt, et al. (Polymer Engineering and Science, 1989, 29, 63–68) describes the synthesis of dianhydride 1. French Patent Specification No. 1,601,094 describes the synthesis of dianhydride 2. Dianhydrides 3–9 are described by Sonnenberg in U.S. Pat. No. 4,002,645.

A wide variety of other dianhydrides, of course, may be used in forming copolyamic acids. Preferred are 3,3',4,4'-benzophenonetetracarboxylic dianhydride (BTDA), 2,2'-dichloro-4,4',5,5'-benzophenone tetracarboxylic dianhydride and the polycyclic diaryl ketone dianhydrides described by Pfeifer, et al., in U.S. Pat. No. 4,698,295 and hereby incorporated by reference. Specific examples of other tetracarboxylic dianhydride components include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives.

A variety of diamines may be useful in the preparation of the polyimides and copolyimides useful in the invention including aromatic diamines such as are 2,5-diaminobenzonitrile, 2-(trifluoromethyl)-1,4-benzenediamine, p-phenylenediamine, 2-chloro-1,4-benzenediamine, 2-fluoro-1,4-benzenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl) methane, diaminodiphenylsulfone, diaminonaphthalene, 1,4-bis(4-aminophenoxy)benzene, 4,4'-diaminobenzophenone, 3,4'-diaminobenzophenone, 1,4-bis (4-aminophenyl)benzene, 9,10-bis(4-aminophenyl) anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl) hexafluoropropane and 2,2-bis[4-(4-aminophenoxy)phenyl] hexafluoropropane; alicyclic diamines such as bis(4-aminocyclohexyl)methane; and aliphatic diamines such as tetramethylenediarnine and hexamethylene diamine. Further, diaminosiloxanes such as bis(3-aminopropyl) tetramethyldisiloxane may be used. Such diamines may be used alone or in combination as a mixture of two or more of them. Preferred diamines for preparing copolyimides are 2,5-diaminobenzonitrile, 2-(trifluoromethyl)-1,4-benzenediamine, 2-(N,N-diallylamino)1,4-benzenediamine, 1-(N,N-diallylamino)-2,4-benzenediamine and 1,4-phenylene diamine. More preferred diamines are 2,5-diaminobenzonitrile, 2-(trifluoromethyl)-1,4-benzenediamine and 2-(N,N-diallylamino)1,4-benzenediamine. Table 2 lists examples of preferred amines, including diamines and monoamines.

TABLE 1
Bis(3,4-dicarboxyphenylketone)aryl dianhydrides useful in preparing polyimides for optical alignment layers.
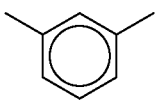
| No. | —Ar— Structure |
|---|---|
| 1 |  |
| 2 | 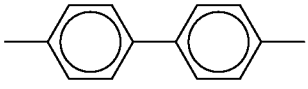 |
| 3 | 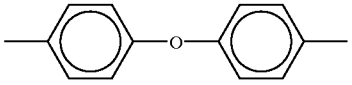 |
| 4 | 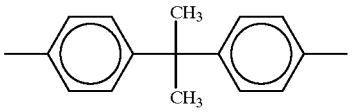 |
| 5 | 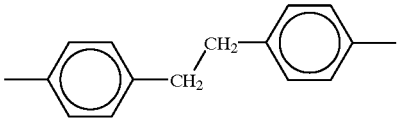 |
| 6 | 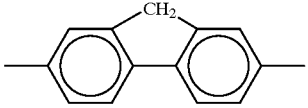 |
| 7 | 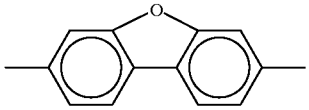 |
| 8 | 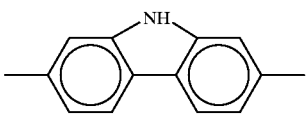 |
| 9 | 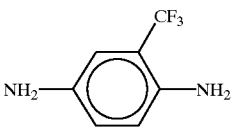 |
TABLE 2
Aromatic amines including diamines and monoamines useful in preparing preferred polyimides for optical alignment layers.
| No. | Structure |
|---|---|
| 1 | 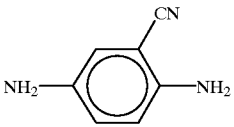 |
| 2 | 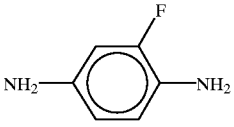 |
| 3 |  |
| 4 | 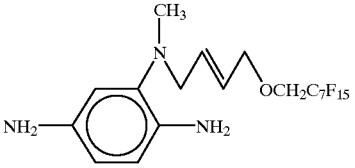 |
| 5 | 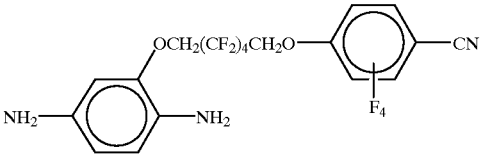 |
| 6 | 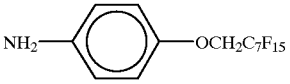 |
| 7 |  |

TABLE 3

Optical Alignment of Polyimide Compositions, Processing Parameters and Results.

| Example No. | Polyimide Composition Dianhydride No.:Diamine No. | Exposure Scan speed mm/sec | Alignment quality | VHR RT | VHR 75° C. |
|---|---|---|---|---|---|
| 1 | 1:1 | 0.75 | Δ+ | 0.892 | 0.463 |
| " | " | 1.5 | Δ | 0.917 | 0.530 |
| 2 | 1:2 | 0.75 | Δ+ | 0.944 | 0.612 |
| " | " | 1.5 | ○ | 0.964 | 0.689 |
| 3 | 1:DAABD + 5 | 0.75 | Δ++ | 0.872 | 0.596 |
| " | " | 1.5 | Δ+ | 0.904 | 0.613 |
| 4 | BTDA:1 | 0.75 | ○ | 0.926 | 0.548 |
| " | " | 1.5 | ○ | 0.922 | 0.508 |
| 5 | BTDA:2 | 1.5 | Δ++ | 0.933 | 0.525 |
| 6 | BTDA:DAABD + 5 | 0.75 | ○+ | 0.855 | 0.387 |
| " | " | 1.5 | ○+ | 0.909 | 0.490 |

○ Good Alignment, low flow effects, uniform.
Δ Fair alignment, flow effects, some non-uniformity (mottled or cloudy background)
X Poor alignment, severe flow effects, non-uniform.
+ Levels of improvement, Δ < Δ+ < Δ++ < ○

Other preferred diamines are the pre-tilt inducing diamines described in U.S. Pat. No. 5,817,743, and pending U.S. application Ser. No. 08/859,404 titled "Polarizable Amines and Polyimides for Optical Alignment of Liquid Crystals", now U.S. Pat. No. 6,0840,057, and Ser. No. 09/425,589 titled "Materials for Inducing Alignment in Liquid Crystals and Liquid Crystal Displays," hereby incorporated by reference. A specific pre-tilt inducing diamine used in the examples is diamine 5 listed in Table 2.

Preferably the novel polyimides and copolyimides of the invention comprise 5 to 100 mol %, and more preferably 20 to 90 mol %, of a pre-tilt inducing diamine.

In preparing polyamic acids for optical alignment layers the molar ratio of diamine to dianhydride usually is 1:1, but can vary between 0.8:1 to 1.2:1. The preferred ratio of diamine to dianhydride is between 0.9:1 and 1.1:1.

To prepare the optical alignment layers the poly(amic acid) solutions or preimidized polyimide solutions are coated onto desired substrates. Coating is usually accomplished with 2 to 30 wt % solids. Any conventional method may be used to coat the substrates including brushing, spraying, spin-casting, meniscus coating, dipping or printing. The preferred techniques for coating substrates are spinning and printing. However, the optical alignment materials of the invention are not limited to use in printing or spinning processes.

The coated substrates are heated in an oven under an inert atmosphere, for instance nitrogen or argon, at elevated temperatures usually not exceeding 300° C. and preferably at or below 180° C. for about from 1 to 12 hours, preferably for about 2 hours or less. The heating process removes the solvent carrier and may be used to further cure the polymer. For instance, the poly(amic) acid films are thermally cured to generate polyimide films.

The concentration of polymer and choice of solvents can affect the optical alignment quality, pretilt and voltage holding ratio (VHR). For example, the optical alignment quality has been observed to improve under the same exposure conditions when the concentration of polymer is decreased in solution. The choice of solvent and/or co-solvents can also affect the alignment quality. A correlation between film thickness and alignment quality also is evident. In particular, the optical alignment quality improves with decreasing thickness. Similarly, VHR increases with decreasing film thickness.

The optical alignment layers are exposed to polarized light to induce alignment of liquid crystals. By "polarized light" is meant light that is elliptically and /or partially polarized such that the light is more polarized along one axis (referred to as the major axis) versus the orthogonal axis (referred to as the minor axis). In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps, microwave excited lamps and black lights in combination with a polarizer. Polarizers useful in generating polarized light from nonpolarized light sources are interference polarizers made from dielectric stacks, absorptive polarizers, diffraction gratings and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by polarized light transmitted through at least one mask having a pattern or with a beam of polarized light scanned in a pattern. Exposing may be accomplished using interference of coherent optical beams forming patterns, i.e., alternating dark and bright lines.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size. A preferred method of dual exposing comprises a two step process of:

(a) exposing at least one optical alignment layer to polarized light at a normal incidence, and (b) exposing the optical alignment layer to polarized light at an oblique incidence. In this preferred process the oblique incidence exposure helps predominately define the pre-tilt angle of the liquid crystal when placed in contact with the optical alignment layer.

Exposure energy requirements vary with the formulation and processing of the optical alignment layer prior and during exposure. A preferred range of exposure energy is about from 0.001 to 100 J/cm$^2$ and most preferred range of exposure energy is about from 0.001 to 5 J/cm$^2$. Lower exposure energy is most useful in large scale manufacturing of optical alignment layers and liquid crystal display elements. Lower exposure energy also minimizes the risk of damage to other materials on the substrates.

The quality of alignment and electrical properties of the liquid crystal cell assembled from exposed substrates can be improved by heating the substrates after exposure but prior to assembly and/or filling of the cell. This additional heating of the substrates and/or cells is not a requirement of the process but may give beneficial results.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell, injection filling and casting of a liquid crystal medium onto an optical alignment layer. Optical alignment layers are pre-exposed to polarized light or they are exposed after contacting the liquid crystal medium.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

As liquid crystal substances used for liquid crystal optical elements, nematic liquid crystal substances, ferroelectric liquid crystal substances, vertical alignment liquid crystals (negative dielectric liquid crystals) etc. are usable. Useful liquid crystals for the invention described herein include positive dielectric liquid crystals including 4-cyano-4'-alkylbiphenyls, 4-cyano-4'-alkyloxybiphenyls, 4-alkyl-(4'-cyanophenyl)cyclohexanes, 4-alkyl-(4'cyanobiphenyl) cyclohexanes, 4-cyanophenyl-4'-alkylbenzoates, 4-cyanophenyl-4'alkyloxybenzoates, 4-alkyloxyphenyl-4'-cyanobenzoates, 4-alkylphenyl-4'alkylbenzoates, 1-(4'-alkylphenyl)-4-cyanopyrimidines, 1-(4'-alkyloxyphenyl)-4-cyanopyrimidines and 1-(4-cyanophenyl)-4-alkylpyrimidines. Other useful liquid crystals are new superfluorinated liquid crystals available from EM Industries, (Hawthrone NY) including the commercial materials: ZLI-5079, ZLI-5080, ZLI-5081, ZLI-5092, ZLI-4792, ZLI-1828, MLC-2016, MLC-2019, MLC-6252 and MLC-6043. Other useful nematic materials for practicing the invention include the commercial liquid crystals available from Dinippon Ink and Chemicals, Inc. (Tokyo, Japan) including the DLC series: 22111, 22112, 22121, 22122, 23070, 23170, 23080, 23180, 42111, 42112, 42122, 43001, 43002, 43003, 63001, 63002, 63003, 63004, and 63005.

Polymerizable liquid crystal monomers also are useful in the invention. Preferred are those disclosed in U.S. Pat. No. 5,846,452, hereby incorporated by reference.

The invention is not limited to the use of liquid crystals defined above. One skilled in the art will recognize that the invention will be of value with many diverse liquid crystal structures and formulations containing mixtures of liquid crystals.

The exposed optical alignment layer induces alignment of a liquid crystal medium at an angle with respect to the major axis of the polarization of the incident light beam and along the surface of the optical alignment layer. One skilled in the art will recognize that the process allows control of the alignment of a liquid crystal medium in any desired direction within the plane of the optical alignment layer by controlling the conditions of the polarized light exposure.

Figure 2:
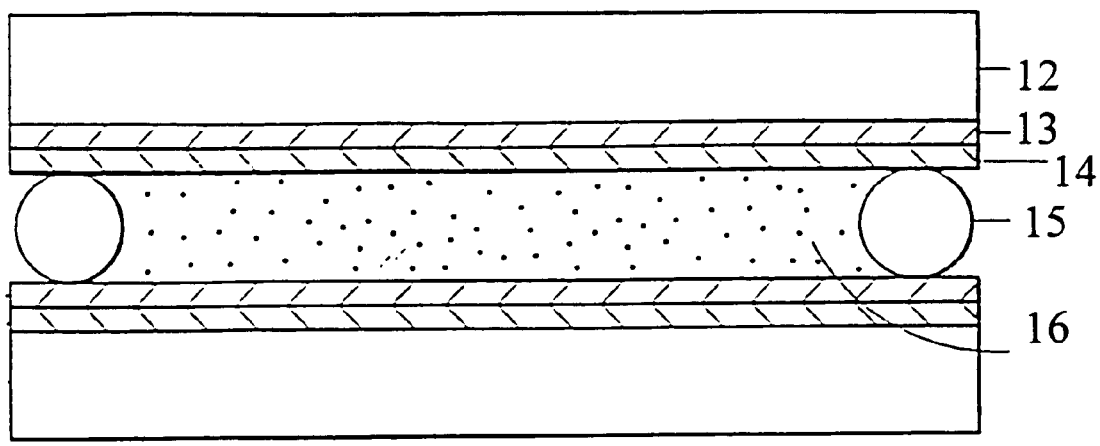
FIG. 2 is a cross-sectional view of a LCD element of the present invention.

A liquid crystal display element of the invention is composed of an electrode substrate having at least one side-chain polyimide optical alignment layer, a voltage-impressing means and a liquid crystal material. FIG. 2 illustrates a typical liquid crystal display element, comprising a transparent electrode 13 of ITO (indium-tin oxide) or tin oxide on a substrate 12 and optical alignment layers 14 formed thereon. The optical alignment layers are exposed to polarized light of a wavelength or wavelengths within the absorption band of the anisotropically absorbing molecules. A spacer concurrently with a sealing resin 15 is intervened between a pair of optical alignment layers 14. A liquid crystal 16 is applied by capillary filling of the cell and the cell is sealed to construct a liquid crystal display element. Substrate 12 may comprise an overcoat film such as an insulating film, a color filter, a color filter overcoat, a laminated polarizing film etc. These coatings and films are all considered part of the substrate 12. Further, active elements such as thin film transistors, a nonlinear resistant element, etc. may also be formed on the substrate 12. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Optical alignment layers of the invention are compatible with all liquid crystal display modes. A liquid crystal display element of the invention can comprise a variety of display configurations including twisted nematic, super twisted nematic, in-plane-switching, vertical alignment, active-matrix, cholesteric, polymer dispersed, ferroelectric, anti-ferroelectric and multi-domain liquid crystal displays. Although the display modes demonstrated in this specification are primarily twisted nematic, the optical alignment layers of the invention are not limited to use in twisted nematic liquid crystal displays.

Optical alignment layers of the invention are useful in many other liquid crystal devices other than liquid crystal displays. These include electro-optical light modulators, all-optical light modulators, erasable read/write optical data storage media; diffractive optical components such as gratings, beamsplitters, lenses (e.g., Fresnel lenses), passive imaging systems, Fourier processors, optical disc and radiation collimators; binary optical devices formed by combining refractive and diffractive optics including eyeglasses, cameras, night vision goggles, robotic vision and three-dimensional image viewing devices; and holographic devices such as heads-up displays and optical scanners.

Voltage Holding Ratio (VHR) is a critical electrical parameter for liquid crystal displays. VHR is a measure of the LCDs ability to retain a voltage during the time between pixel updates (frame time). The type of liquid crystal, alignment layers and cell geometry can all affect the measured VHR value. In the examples to follow, liquid crystal test cells comprising soda-lime substrates with patterned indium-tin-oxide (ITO) transparent electrodes are described. The overlap of the electrodes was about 1 cm$^2$ after the test cell was assembled. Approximately 2–3 inch wire leads were attached to the patterned ITO electrodes using an ultrasonic solder iron after the test cell is assembled but prior to filing. The leads were attached to a VHR measurement system (Elsicon VHR-100 Voltage Holding Ratio Measurement System, Wilmington, Delaware) using test clips after the cell was filled and annealed. The VHR for the examples was measured for a 20 msec frame time, which is typically used for measuring VHR.

The performance characteristics of liquid crystal display test cells in Examples 1–3 and comparative examples 4–6 are summarized in Table 3. Comparison of data presented in Table 3 reveals that, in general, higher exposure energy (lower scan speed) for the materials leads to lower VHR at room temperature (RT) and elevated temperature (75° C.). However, comparison of examples 3 and 6, containing pre-tilt inducing diamines, indicates that VHR's at 75° C. are significantly higher in example 3, comprising a bis(3,4-dicarboxyphenylketone)aryl dianhydride, than in example 6, comprising BTDA. Also, there is only a small decrease in VHR at higher exposure energy in example 3, whereas with BTDA there is greater than a 20% drop in VHR at 75° C. Furthermore, example 2 shows that alignment quality improves as exposure energy is decreased, and a comparison of example 2 with 5 indicate a significantly improved VHR at elevated temperature in example 2. Thus, it is clear that the bis(dicarboxyphenylketone)aryl dianhydrides exhibit a positive influence on VHR performance of polyimides at elevated temperature.

Some Examples use 1-(N,N-diallylamino)-2,4-benzenediamine (DAABD) as a comonomer. This material was prepared in the following manner:

A mixture of 2,4-dinitrofluorobenzene (9.3 g), N-methylpyrrolidinone (NMP, 50 mL), diallylamine (5.82 g) and potassium carbonate (6.9 g) was stirred at ambient temperature for 1 h. The mixture was poured into water and extracted with ethyl ether. The extract was washed twice with water, once with saturated brine solution, and dried over magnesium sulfate. Concentration of the extract gave N,N-diallyl-2,4-dinitrobenzenamine as a yellow oil (14.6 g).

The above yellow oil (14.6 g) was treated with a solution of tin (II) chloride dihydrate (90.0 g,), 10 N hydrochloric acid (75 mL) and ethanol (250 mL) at 55–60° C. for 14.5 h. The mixture was poured into ice water and basified with cold 20 wt % potassium hydroxide solution (750 g). The mixture was extracted with ethyl ether, the extracts washed with water three times, washed with saturated brine solution, and dried (MgSO$_4$). The mixture was concentrated, purified by chromatography followed by Kugelrohr distillation (115–120° C., 0.1 mm Hg) to give 1-(N,N-diallylamino)-2,4-benzenediamine as yellow oil. $^1$H NMR (CDCl$_3$) 6.79 (d, 1H), 6.08 (m, 2H), 5.80 (m, 2H), 5.10 (m, 4H), 3.45 (dt, 4H), 4.0 (bs) and 3.5 (bs).

The following procedures describes the synthesis of diamine 5, used in examples:

A mixture of 1H,1H-perfluorooctanol (30.0 g, 0.075 mol), 1,4-dibromo-2-butene (48.0 g, 0.25 mol), Aliquat 336 (1.5 g), toluene (150 mL) and potassium hydroxide (0.075 mol, 4.95 g) in water (50 mL) was heated to 80–90° C. for 3 hr. The mixture was extracted with water-ethyl ether. The extract was washed with water two times, washed with saturated sodium chloride solution, dried (MgSO$_4$) and concentrated to an oil. Excess dibromide was removed by recrystallization in hexane. The remaining oil was Kugelrohr distilled (0.1 mm Hg, 70–95° C.) to give 28.0 g of the 1-bromo-4-(1H, 1H,-perfluorooctyloxy)-2-butene.

The 1-bromo-4-(1H,1H,-perfluorooctyloxy)-2-butene (28.0 g) was added to a mixture of 40 wt % methyl amine (59 mL), tetrahydrofuran (60 mL) and ethanol (40 mL) at 40° C. and the mixture stirred at ambient temperature for 2 hr. The mixture was basified with 20 wt % potassium hydroxide (KOH, 15 g), extracted, concentrated and distilled to give 18.0 g 1-(N-methylamino)-4-(1H,1H,-perfluorooctyloxy)-2-butene (0.1 mmHg, 85–110° C.).

A mixture of 1-(N-methylamino)-4-(1H, 1H,-perfluorooctyloxy)-2-butene (17.3 g), 3-fluoro-4-nitroaniline (5.46 g), triethylamine (7 mL) and NMP (80 mL) was heated 16 hr at 80–90° C. The mixture was extracted in the normal fashion and purified by chromatography to give 15.6 g of the 3-substituted nitroamine.

The nitroamine (15.2 g, 25 mmol) was treated with tin (II) chloride dihydrate (24.6 g, 0.11 mol), 10 N hydrochloric acid (20 mL) and ethanol (200 mL) for 16 hr at 40–45° C. The mixture was diluted with cold water, basified with 20 wt % KOH (220 g), and extracted in the normal fashion. Purification by chromatography on silica gel and crystallization gave diamine 5 (mp 46–47° C.).

The following Examples are meant to exemplify the embodiments and are not meant to limit the scope of the invention. Dianhydrides and diamines used in the formulations are identified by the numbers in Tables 1 and 2.

EXAMPLE 1

A mixture of dianhydride 1 (213 mg, 0.50 mmol), 2-(trifluoromethyl)-1,4-benzenediamine (diamine 1, 88 mg, 0.50 mmol) and γ-butyrolactone (1.20 g) was stirred at 18° C. for 18 h under a nitrogen atmosphere. The polyamic acid solution was diluted to 5 wt % with γ-butyrolactone (4.5 g).

Two 0.9 inch by 1.2 inch by 1 millimeter thick soda lime glass substrates with transparent indium-tin-oxide (ITO) coatings (DCI, Inc. Lenexa, Kans. 66219) were spin-coated and cured with the polyamic acid formulation to give optical alignment layers. Spin coating was achieved by filtering the prepolymer solution through a 0.45 micron Teflon filter membrane onto the surface of clean ITO substrates. The substrates were spun at 2500 RPM for 1 minute to produce uniform thin films. The resultant thin films were cured under nitrogen for 0.25 hr at 80° C. followed by 1 h at 180° C.

FIG. 1 is a schematic of the experimental set-up used to expose the substrates. The laser beam of about 1 cm diameter from laser 1, polarized along direction 2, entered a polarizing rotator and beam splitter combination 3 and, upon exiting, two polarization components 6 and 7 separated as they propagated away from 3. The wavelength range of the laser was 300–336 nm. By adjusting the polarizing rotator in 3, the ratio of optical power in 6 and 7 can be adjusted and, in this case, the ratio was adjusted to be 1:6. The total power in 6 and 7 was about 500 mW. Mirrors 5 reflected 6 and 7 through cylindrical lenses 8 and 9 with focal lengths of 5 cm and 10 cm, respectively. After passing through cylindrical lenses 8 and 9, 6 and 7 were focused into lines of about 1 cm×0.2 cm onto the substrate(s) 10. The separation between the two parallel focused lines was about 1.5 mm. As depicted in FIG. 1, the substrates 10 were scanned perpendicular to the focused lines. Since the focused line lengths of about 1 cm was smaller than the desired exposure area, after scanning one time, the substrates were stepped 1.5 mm perpendicular to the scan direction (along the focused lines). The step and scan 11 were repeated until the entire substrate area was exposed. The scan speed for this exposure was 0.75 mm/s.

After exposure, the substrates were assembled with orthogonal orientation of the optically generated alignment direction. The cell thickness was about 4 microns. The cell was subsequently capillary filled with nematic liquid crystals suitable for active matrix liquid crystal displays. As expected, the liquid crystals were observed to align in a twisted nematic orientation when viewed between polarizers. Upon annealing the liquid crystal cell above the liquid crystal isotropic point (120° C. for 30 minutes), the uniformity of the alignment was observed to improve and was of fair quality.

A further trial using a scan speed of 1.5 mm/sec resulted in similar alignment quality as the 0.75 mm/s scan speed after anneal.

EXAMPLE 2

A mixture of dianhydride 1 (213 mg, 0.50 mmol), 2,5-diaminobenzonitrile (diamine 2, 66.6 mg, 0.50 mmol) and γ-butyrolactone (1.12 g) was stirred at 18° C. for 18 h under a nitrogen atmosphere. The polyamic acid solution was diluted to 5 wt % with γ-butyrolactone (4.2 g). Further processing to prepare optical alignment layers and display test cells was accomplished as described in Example 1.

EXAMPLE 3

A mixture of dianhydride 1 (142 mg, 0.333 mmol), 1-(N,N-diallylamino)-2,4-benzenediamine (DAABD, 6.8 mg, 0.033 mmol), diamine 5 (176.8 mg, 0.300 mmol) and NMP (1.30 g) was stirred at 18° C. for 18 h under a nitrogen atmosphere. The polyamic acid solution was diluted to 5 wt % with γ-butyrolactone (3.09 g) and NMP (1.79 g). Further processing to prepare optical alignment layers and display test cells was accomplished as described in Example 1. At a scan speeds of 0.75 and 1.5 mm/sec the pretilt was measured with the PAS-301 Pretilt Analysis System (Elsicon, Inc, Wilmington, Del.) to be 0.18 and 1.8 degrees, respectively. No reverse tilt disclinations were observed upon switching the cells.

EXAMPLE 4 (COMPARATIVE)

A mixture of 3,3',4,4'-benzophenonetetracarboxylic dianhydride (6.44 g), 2-(trifluoromethyl)-1,4-benzenediamine (diamine 1, 3.52 g) and γ-butyrolactone (40 g) was stirred at room temperature for 24 h under a nitrogen atmosphere. The solution was diluted to a 10 wt % solution with γ-butyrolactone (49.7 g) and filtered through a 0.45 micron Teflon membrane filter. The solution was diluted to 3.5 wt % solution and spin coated, cured and exposed to polarized light as described in Example 1.

EXAMPLE 5 (COMPARATIVE)

A mixture of 3,3',4,4'-benzophenonetetracarboxylic dianhydride (6.44 g), 2,5-diaminobenzonitrile (diamine 2, 2.66 g) and γ-butyrolactone (37.8 g) was stirred at room temperature for 20 h under a nitrogen atmosphere. The solution was diluted to a 10 wt % solution with γ-butyrolactone (43.9 g) and filtered through a 0.45 micron Teflon membrane filter. The solution was diluted to 3 wt % solution and spin coated, cured and exposed to polarized light as described in Example 1.

EXAMPLE 6 (COMPARATIVE)

A mixture of 3,3',4,4'-benzophenonetetracarboxylic dianhydride (3.69 g, 11.47 mmol), 1-(N,N-diallylamino)-2,4-benzenediamine (0.233 g, 1.15 mmol), diamine 5 (6.08 g, 10.32 mmol) and NMP (39.6 g) was stirred at 18° C. for 18 h under a nitrogen atmosphere. The polyamic acid solution was diluted to 10 wt % with γ-butyrolactone (45.1 g) and NMP (5.03 g). For spinning, the polyamic acid solution was further diluted to 5 wt % with 50/50 γ-butyrolactone/NMP solution. At a scan speed of 0.75 and 1.5 mm/sec the pretilt was measured to be 21.9 and 29 degrees, respectively. No reverse tilt disclinations were observed upon switching the cells.

What is claimed is:

1. A process for preparing an optical alignment layer for aligning liquid crystals comprising:

preparing a polyimide layer, comprising anisotropically absorbing molecules, on a substrate, exposing said polyimide layer to polarized light; the polarized light having a wavelength within the absorption band of said anisotropically absorbing molecules; wherein the resulting exposed anisotropically absorbing molecules induce alignment of a liquid crystal medium at an angle with respect to the major axis of the polarization of the incident light and along the surface of the optical alignment layer;

wherein the polyimide layer comprises the structural element I

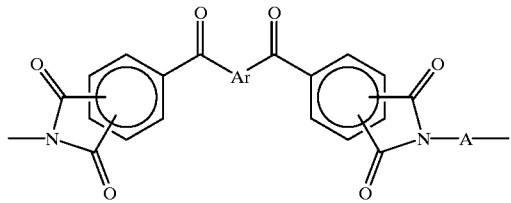

I wherein Ar is a divalent aryl radical and A is a divalent organic radical with two or more carbons.

2. A process of claim 1 wherein Ar is selected from the group of

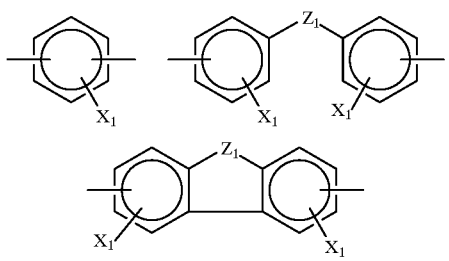

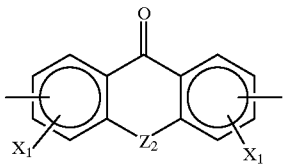

wherein $X_1$, independently, is selected from the group of H, Cl, Br, F, —CN, —CF$_3$, —(R)$_2$N—, —OR and R, $Z_1$ is selected from the group of covalent bond, —O—, —NR$_1$—, —(R$_1$)$_2$C—, —CH$_2$CH$_2$—, and —C(O)—, $Z_2$ is selected from the group —O—, —NR$_1$—, and —(R$_1$)$_2$C—, $R_1$ is H or lower alkyl group and R is a lower alkyl group.

3. An optical alignment layer prepared by the process of claim 1.

4. A liquid crystal display element comprising at least one optical alignment layer of claim 3.

* * * * *